(No Model.)

J. F. STEWARD.
METHOD OF MAKING ROLLER BEARINGS.

No. 533,506. Patented Feb. 5, 1895.

Witnesses
Arthur Johnson
E. A. Clark

Inventor.
John F. Steward

UNITED STATES PATENT OFFICE.

JOHN F. STEWARD, OF CHICAGO, ILLINOIS.

METHOD OF MAKING ROLLER-BEARINGS.

SPECIFICATION forming part of Letters Patent No. 533,506, dated February 5, 1895.

Original application filed August 31, 1892, Serial No. 444,638. Divided and this application filed April 10, 1893. Serial No. 469,661. (No model.)

*To all whom it may concern:*

Be it known that I, JOHN F. STEWARD, of Chicago, in the county of Cook and State of Illinois, have invented a new method of making roller-bearings of the kind in which the ends of the rollers are pivoted in frames, the bar or bars of which that connect the end portions of the said frames in which the rollers are pivoted reaching from said end to end and between the rollers, of which the following is a full description, reference being had to the accompanying drawings, in which—

Figure 1:
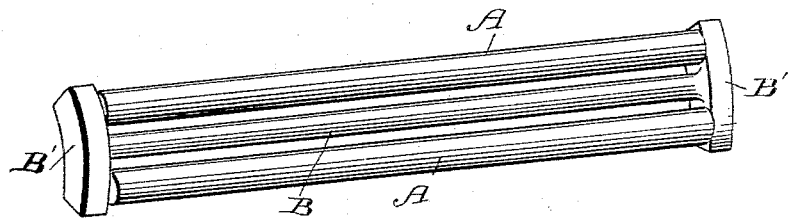
Figure 2:
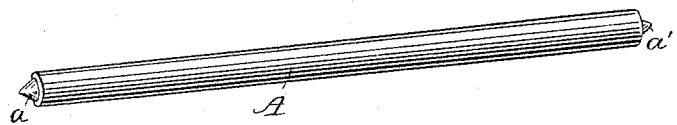

Figure 1 shows the kind of roller bearing that is produced by my method; Fig. 2, the preferred form of the roller, and Fig. 3 the parts of the roller bearing when ready to be completed.

The object of my invention is to produce the roller bearings in the simplest possible manner, and in order to make the method clear I will first describe the bearing produced.

A are rollers having pivots $a$ at each end.

B is a frame adapted to receive the rollers having recesses $b$ into which the pivots $a$, enter. If desirable, however, the recesses may be made in the ends of the rollers and pivots formed in lieu of the recesses $b$ shown. In other words, the positions of the pivots and recesses may be reversed as is often done in similar cases. I have shown in this case a single truck, as I term it, a series of which is intended to be ranged around a shaft and within a casing. The bearing so made forms the subject matter of an application filed August 31, 1892, Serial No. 444,638, of which this application is a division.

Figure 3:
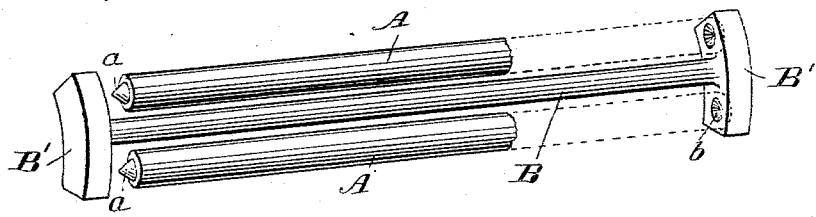

The method of manufacture is as follows: The frame, consisting of the bar B having the T-heads $b'$, is cast of any soft metal that can be shortened by pressure—in other words, that can be "upset." I make the rollers A of a given length and make the bar B of the frame of such length that the rollers can be inserted between the T-heads, as shown in Fig. 3, and then apply pressure by any suitable means that shall "upset" the bar B and thus force the T-heads onto the pivots of the rollers.

What I claim as my invention, and desire to secure by Letters Patent, is—

The method of forming roller bearings of the kind having a common support for both ends of the rollers and in which they are pivoted, consisting in making said support of soft metal, placing the rollers between the ends thereof and shortening the said frame by pressure, substantially as described.

JOHN F. STEWARD.

Witnesses:
ARTHUR JOHNSON,
M. B. HART.